United States Patent
Li et al.

(10) Patent No.: US 10,285,064 B2
(45) Date of Patent: May 7, 2019

(54) METHOD AND APPARATUS FOR COORDINATING RESOURCES BETWEEN DIFFERENT NETWORKS

(71) Applicant: Telefonaktiebolaget LM Ericsson (publ), Stockholm (SE)

(72) Inventors: Gen Li, Beijing (CN); Tim Irnich, Neuss (DE); Cong Shi, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 135 days.

(21) Appl. No.: 15/127,933

(22) PCT Filed: Aug. 18, 2014

(86) PCT No.: PCT/CN2014/084640
§ 371 (c)(1),
(2) Date: Sep. 21, 2016

(87) PCT Pub. No.: WO2015/154363
PCT Pub. Date: Oct. 15, 2015

(65) Prior Publication Data
US 2017/0099605 A1   Apr. 6, 2017

(30) Foreign Application Priority Data

Apr. 9, 2014  (WO) ................ PCT/CN2014/075022

(51) Int. Cl.
*H04W 16/14*   (2009.01)
*H04W 72/12*   (2009.01)

(52) U.S. Cl.
CPC ....... *H04W 16/14* (2013.01); *H04W 72/1263* (2013.01); *H04W 72/1289* (2013.01)

(58) Field of Classification Search
CPC ............. H04W 16/14; H04W 72/1263; H04W 72/1289
(Continued)

(56) References Cited

U.S. PATENT DOCUMENTS

2010/0267408 A1   10/2010   Lee et al.
2010/0309869 A1   12/2010   Kim et al.
(Continued)

FOREIGN PATENT DOCUMENTS

CA       2848413 A1    4/2013
CN    101296475 A    10/2008
(Continued)

OTHER PUBLICATIONS

Aydin, Osman et al., "Deliverable D4.1: Summary on preliminary trade-off investigations and first set of potential network-level solutions," Document No. ICT-317669, Project Name: Mobile and wireless communications Enablers for the Twenty-twenty Information Society (METIS), Version: 1, delivered Sep. 30, 2013, METIS 2020 Project, 97 pages.
(Continued)

*Primary Examiner* — Marcus Hammonds
(74) *Attorney, Agent, or Firm* — Patent Portfolio Builders, PLLC

(57) ABSTRACT

Various embodiments of the present disclosure provide a method for coordinating resources between different operating networks. The method comprises determining whether coordination with a second operating network is triggered and transmitting a coordination request to the second operating network, in response to determining that the coordination is triggered. The method also comprises receiving a coordination response from the second operating network. The method further comprises determining blanking patterns by initiating a coordination procedure between the first and second operating networks to, in response to receiving an acknowledgement in the coordination response from the second operating network; and scheduling according to one of the determined blanking patterns in the first operating network.

14 Claims, 9 Drawing Sheets

(58) Field of Classification Search
USPC .......................................................... 455/454
See application file for complete search history.

(56) References Cited

U.S. PATENT DOCUMENTS

| | | |
|---|---|---|
| 2010/0329113 A1 | 12/2010 | Madan et al. |
| 2011/0310830 A1* | 12/2011 | Wu .................... H04W 72/1289 370/329 |
| 2012/0236731 A1 | 9/2012 | Beaudin |
| 2013/0308524 A1 | 11/2013 | Tavildar et al. |
| 2013/0322374 A1 | 12/2013 | Cai et al. |
| 2014/0226504 A1 | 8/2014 | Tavildar et al. |
| 2015/0031284 A1 | 1/2015 | Pitakdumrongkija et al. |
| 2015/0249530 A1* | 9/2015 | Zhang .................... H04L 5/0058 370/329 |
| 2016/0338083 A1* | 11/2016 | Li .......................... H04W 16/14 |
| 2016/0353347 A1* | 12/2016 | Jun ........................ H04W 16/04 |

FOREIGN PATENT DOCUMENTS

| | | |
|---|---|---|
| CN | 102026275 A | 4/2011 |
| CN | 102438271 A | 5/2012 |
| CN | 102484575 A | 5/2012 |
| CN | 102573039 A | 7/2012 |
| CN | 102833760 A | 12/2012 |
| CN | 103202056 A | 7/2013 |
| EP | 2040503 A1 | 3/2009 |
| EP | 2663112 A1 | 11/2013 |
| EP | 2675225 A1 | 12/2013 |
| WO | 2011020062 A2 | 2/2011 |
| WO | 2011119750 A1 | 9/2011 |
| WO | 2013127310 A1 | 9/2013 |
| WO | 2014047838 A1 | 4/2014 |
| WO | 2015109439 A1 | 7/2015 |
| WO | 2015109441 A1 | 7/2015 |

OTHER PUBLICATIONS

Extended European Search Report for European Patent Application No. 14880271.3, dated Sep. 26, 2017, 6 pages.
International Preliminary Report on Patentability for International Patent Application No. PCT/CN2014/070999, dated Aug. 4, 2016, 6 pages.
Extended European Search Report for European Patent Application No. 14880358.8, dated Sep. 26, 2017, 8 pages.
International Preliminary Report on Patentability for International Patent Application No. PCT/CN2014/070997, dated Aug. 4, 2016, 6 pages.
International Preliminary Report on Patentability for International Patent Application No. PCT/CN2014/084640, dated Oct. 20, 2016, 6 pages.
Nokia Siemens Networks, "R3-103555: On X2 signaling for TDM eICIC in Macro+Pico scenarios," Third Generation Partnership Project (3GPP), TSG RAN WG3 Meeting #70, Nov. 15-19, 2010, 4 pages, Jacksonville, USA.
Extended European Search Report for European Patent Application No. 14888742.5, dated Nov. 28, 2017, 8 pages.
Non-Final Office Action for U.S. Appl. No. 15/111,166, dated Feb. 23, 2018, 9 pages.
Notice of Allowance for U.S. Appl. No. 15/111,171, dated Feb. 20, 2018, 10 pages.
Klotz, Walter, "Graph Coloring Algorithms," Mathematics Report, vol. 5, 2002, Technical University Clausthal, pp. 1-9.
International Search Report and Written Opinion for International Patent Application No. PCT/CN2014/070999, dated Aug. 25, 2014, 7 pages.
International Search Report and Written Opinion for International Patent Application No. PCT/CN2014/070997, dated Oct. 28, 2014, 8 pages.
International Search Report and Written Opinion for International Patent Application No. PCT/CN2014/084640, dated Jan. 8, 2015, 8 pages.

* cited by examiner

METHOD AND APPARATUS FOR COORDINATING RESOURCES BETWEEN DIFFERENT NETWORKS

This application is a 35 U.S.C. § 371 national phase filing of International Application No. PCT/CN2014/084640, filed Aug. 18, 2014, which claims the benefit of International Application No. PCT/CN2014/075022, filed Apr. 9, 2014, the disclosures of which are incorporated herein by reference in their entireties.

TECHNICAL FIELD

The non-limiting and exemplary embodiments of the present disclosure generally relate to the technical field of wireless communications, and specifically to a method and apparatus for coordinating resources between different networks, particularly for millimeter-wave MMW networks.

BACKGROUND

This section introduces aspects that may facilitate a better understanding of the disclosure. Accordingly, the statements of this section are to be read in this light and are not to be understood as admissions about what is in the prior art or what is not in the prior art.

Mobile broadband continues to drive a demand for higher overall traffic capacity and a higher achievable end-user data rate in a radio access network. Several application scenarios in the future will require data rates up to 10 Gbps in local areas. The demand for very high system capacity and very high end-user date rates may be met by networks where a distance between access nodes ranges from a few meters in indoor deployments up to roughly 50 m in outdoor deployments, i.e. with an infra-structure density considerably higher than the densest networks of today. The wide transmission bandwidth required for providing a data rate up to 10 Gbps and above may only be obtained from spectrum allocations in the millimeter-wave band. High-gain beamforming, typically realized with array antennas, may be used to mitigate the increased path loss at higher frequencies.

MMW networks have a number of properties that, generally speaking, make operations under the shared spectrum promising. Due to a small antenna size at high frequencies, MMW networks heavily rely on high-gain beamforming, which enables significantly higher resource reuse and alleviate interference between multiple networks. It is expected that these networks will predominantly be deployed in the form of "high-capacity coverage islands" in areas where a very high traffic demand is expected or a very high connection speed is required, which means that an area will normally be covered by one network only rather than having multiple parallel networks deployed by different operators. Hence, inter-network interference may predominantly occur between partially overlapping, adjacent or neighboring, i.e. with a certain distance in-between, networks. In such a situation, it is preferable to avoid fragmentation of the available bandwidth into one exclusive sub-band per network, since a large amount of spectrum would remain unused at times when networks are not simultaneously fully loaded, and peak data rates would be limited to a fraction of what could theoretically be achieved. It would instead be preferable that each MMW network may access the full available frequency bandwidth so order to maximize spectrum utilization and support peak data rates. In this case, inter-network interference may be unavoidable.

FIG. 1 illustrates an inter-network interference situation between two operating networks sharing a spectrum, which may be two MMW networks, wherein a first operating network shown with a dotted pattern comprises three access nodes AN1-AN3 which serve user equipment UE1-UE3, respectively and a second operating network shown with a striped pattern also comprises three access nodes AN4-AN6 which serve UE4-UE6. The two operating networks are located in a same area and operate on a same channel. Hence they may cause interference to each other. The interference between links in different networks may be bidirectional or uni-directional. For example, link A1 between AN1 and UE1 in the first operating network may cause interference to link B1 between AN4 and UE5 in the second operating network, which is illustrated with a single head arrow; and link A2 between AN2 and UE2 in the first operating network may cause interference to link B2 between AN6 and UE6 in the second operating network and vice versa, which is illustrated with a double head arrow.

In this case, it would be necessary to find a technology so that residual interference in border areas between two independent networks may be handled in an efficient way, which is called interference coordination.

In order to support the above spectrum sharing scenario as illustrated in FIG. 1, several existing solutions have been proposed.

Wireless Local Area Network LAN systems, like IEEE 802.11 systems support such a scenario based on contention-based access to radio resources. However, the principle of the contention-based access has a fundamental issue that overhead grows proportionally when the system load increases. In combination with beamforming, this issue would be even more significant due to existence of hidden node problems.

Coordinated intra-network or inter-cell spectrum re-use is already widely studied in current cellular networks. For example, the Almost Blank Subframe (ABS) concept has been intensively studied to reduce interference between third generation partnership project long term 3GPP LTE Macro and Pico cells in heterogeneous network scenarios. Similarly, the Dynamic Point Blanking (DPB) concept has been proposed to improve performance of Coordinated Multi-Point (CoMP) transmission and reception. However, resource coordination for inter-network spectrum sharing networks differs from intra-network coordination in a number of aspects as below.

Firstly, inter-network interference may be stronger than intra-network interference since a mobile terminal belonging to a network may be closer to a transmitter in another network to which the mobile terminal is not permitted to connect. Therefore, the potential benefit of inter-network resource coordination is more significant.

Secondly, coordination objectives are different. The objective of the inter-network coordination is mainly focused on fairness and equitable access to spectrum resources. Whereas, the objective of the intra-network coordination is to improve overall network capacity, which means it is acceptable that one of the coordinating entities sacrifice itself for the benefit of overall sum utility.

Thirdly, the inter-network coordination shall be slower than the intra-network coordination in time scale, so as to obtain a basis for network internal radio resource management that may be valid for relatively long time.

Therefore, the existing intra-network interference coordination technique may not applicable to the inter-network resource coordination.

Other existing link-specific coordination context-based solutions as proposed in PCT applications PCT/CN2014/070999 and PCT/CN2014/070997 may achieve the inter-network resource coordination between different MMW networks sharing a spectrum. However, the link-by-link coordination may result in more overhead since for each coordinated link, a certain amount of information have to be exchanged between the involved networks. If such information is transmitted over-the-air, it will reduce or even level out performance gains from the interference coordination; and in an extreme case, it may even lead to lower performance compared to an uncoordinated baseline case.

Hence, there is a need for a solution to coordinate scheduling of interfering links between different MMW networks so that interfering transmissions do not or at least less probably end up on the same radio resources, while reducing the amount of information exchanged between the networks.

SUMMARY

Various embodiments of the disclosure aim at addressing at least part of the above problems and disadvantages. Other features and advantages of embodiments of the disclosure will also be understood from the following description of specific embodiments when read in conjunction with the accompanying drawings, which illustrate, by way of example, the principles of embodiments of the disclosure.

Various aspects of embodiments of the disclosure are set forth in the appended claims and summarized in this section. It shall be understood that the scope of the disclosure is limited by the appended claims.

In a first aspect of the disclosure, there is provided a method in a first operating network for coordinating resources between different operating networks. The method comprises determining whether coordination with a second operating network is triggered; and transmitting a coordination request to the second operating network, in response to determining that the coordination is triggered. The method also comprises receiving a coordination response from the second operating network and determining blanking patterns by initiating a coordination procedure between the first and second operating networks to, in response to receiving an acknowledgement in the coordination response from the second operating network. The method further comprises scheduling according to a first blanking pattern of the at least two determined blanking patterns in the first operating network.

In one embodiment, a second blanking pattern of the at least two determined blanking patterns may be used in the second operating network for scheduling. The second blanking pattern may be different from the first blanking pattern.

In another embodiment, the scheduling according to the first blanking pattern of the determined blanking patterns may comprises one of: scheduling, according to the first blanking pattern, all links in the first operating network; scheduling, according to the first blanking pattern, all links belonging to one or more access nodes in the first operating network that cause interference to the second operating network; or scheduling, according to the first blanking pattern, one or more links in the first operating network that cause interference to the second operating network.

In yet another embodiment, the coordination with the second operating network may be triggered periodically or by detection of new interference from the second operating network.

In yet another embodiment, the coordination procedure may comprise blanking ratio coordination and blanking position coordination between the first and second operating networks.

In yet another embodiment, the blanking ratio coordination may comprise averaging two blanking ratios proposed respectively by the first and second operating networks as the coordinated blanking ratio for the determined blanking patterns.

In yet another embodiment, the blanking position coordination may comprise selecting from a plurality of pre-defined blanking patterns two different blanking patterns according to a blanking ratio obtained from the blanking ratio coordination; and signaling the selected two different blanking patterns to the second operating network.

In a second aspect of the present disclosure, there is provided a method in a second operating network for coordinating resources between a first and the second operating networks. The method comprises receiving a coordination request from the first operating network and transmitting an acknowledgement in a coordination response to the first operating network. The method also comprises determining at least two blanking patterns by participating in a coordination procedure initiated by the first operating network and scheduling according to a second blanking pattern of the at least two determined blanking patterns in the second operating network.

In one embodiment, a first blanking pattern of the at least two determined blanking patterns may be used in the first operating network for scheduling. The first blanking pattern may be different from the second blanking pattern.

In another embodiment, the scheduling according to the second blanking pattern may comprise one of: scheduling, according to the second blanking pattern, all links in the second operating network; scheduling, according to the second blanking pattern, all links belonging to one or more access nodes in the second operating network that cause interference to the first operating network; or scheduling, according to the second blanking pattern, one or more links in the second operating network that cause interference to the first operating network.

In yet another embodiment, the coordination procedure may comprise blanking ratio coordination and blanking position coordination between the first and second operating networks.

In yet another embodiment, the blanking ratio coordination may comprise averaging two blanking ratios proposed respectively by the first and second operating networks as the coordinated blanking ratio for the determined blanking patterns.

In yet another embodiment, the blanking position coordination may comprise selecting from a plurality of pre-defined blanking patterns two different blanking patterns according to a blanking ratio obtained from the blanking ratio coordination; and signaling the selected two different blanking patterns to the first operating network.

In a third aspect of the present disclosure, there is provided an apparatus in a first operating network for coordinating resources between the first and a second operating networks. The apparatus comprises a determining module configured to determine whether coordination with the second operating network is triggered and a transmitting module configured to transmit a coordination request to the second operating network, in response to the determining module determining that the coordination is triggered. The apparatus also comprises a receiving module configured to receive a coordination response from the second operating network and a coordinating module configured to determine at least two blanking patterns by initiating a coordination procedure between the first and second operating networks, in response to receiving an acknowledgement in the coordination response from the second operating network. The apparatus further comprises a scheduling module configured to perform scheduling according to a first blanking pattern of the at least two determined blanking patterns in the first operating network.

In one embodiment, a second blanking pattern of the at least two determined blanking patterns may be used in the second operating network for scheduling. The second blanking pattern may be different from the first blanking pattern.

In a fourth aspect of the present disclosure, there is provided an apparatus in a second operating network for coordinating resources between different operating networks. The apparatus comprises a receiving module configured to receive a coordination request from the first operating network and a transmitting module configured to transmit an acknowledgement in a coordination response to the first operating network. The apparatus also comprises a coordinating module configured to determine at least two blanking patterns by participating in a coordination procedure initiated by the first operating network. The apparatus further comprises a scheduling module configured to perform scheduling according to a second blanking pattern of the at least two determined blanking patterns in the second operating network.

In one embodiment, a first blanking pattern of the at least two determined blanking patterns may be used in the first operating network for scheduling. The first blanking pattern may be different from the second blanking pattern.

In a fifth aspect of the present disclosure, there is provided an apparatus in a first operating network for coordinating resources between different operating networks. The apparatus comprises a processor and a memory. The memory contains instructions executable by the processor whereby the apparatus is operative to determine whether coordination with the second operating network is triggered and to transmit a coordination request to the second operating network, in response to determining that the coordination is triggered. The memory contains the instructions executable by the processor whereby the apparatus is further operative to receive a coordination response from the second operating network; determine at least two blanking patterns by initiating a coordination procedure between the first and second operating networks to, in response to receiving an acknowledgement in the coordination response from the second operating network; and schedule according to a first blanking pattern of the at least two determined blanking patterns in the first operating network.

In a sixth aspect of the present disclosure, there is provided an apparatus in a second operating network for coordinating resources between different operating networks. The apparatus comprises a processor and a memory. The memory contains instructions executable by the processor whereby the apparatus is operative to receive a coordination request from the first operating network and to transmit an acknowledgement in a coordination response to the first operating network. The memory contains the instructions executable by the processor whereby the apparatus is further operative to determine blanking patterns by participating in a coordination procedure initiated by the first operating network and to schedule according to a second blanking pattern of the at least two determined blanking patterns in the second operating network.

In a seventh aspect of the present disclosure, there is provided an apparatus in a first operating network for coordinating resources between different operating networks, comprising processing means adapted to determine whether coordination with a second operating network is triggered and to transmit a coordination request to the second operating network, in response to determining that the coordination is triggered. The processing means is also adapted to receive a coordination response from the second operating network and to determine blanking patterns by initiating a coordination procedure between the first and second operating networks to, in response to receiving an acknowledgement in the coordination response from the second operating network. The processing means is further adapted to schedule according to a first blanking pattern of the at least two determined blanking patterns in the first operating network.

In an eighth aspect of the present disclosure, there is provided an apparatus in a second operating network for coordinating resources between different operating networks, comprising processing means adapted to receive a coordination request from a first operating network and transmit an acknowledgement in a coordination response to the first operating network. The processing means is also adapted to determine blanking patterns by participating in a coordination procedure initiated by the first operating network and to schedule according to a second blanking pattern of the at least two determined blanking patterns in the second operating network.

In a ninth aspect of the present disclosure, there is provided a computer program, comprising instructions which, when executed on at least one processor, cause the at least one processor to carry out the method according to the first aspect of the present disclosure.

In a tenth aspect of the present disclosure, there is provided a computer program, comprising instructions which, when executed on at least one processor, cause the at least one processor to carry out the method according to the second aspect of the present disclosure.

According to the various aspects and embodiments as mentioned above, resources may be effectively coordinated between two different operating networks, e.g. MMW networks. Interference may be avoided or reduced from exceeding a certain level between adjacent MMW networks operating at the same band, while the coordination overhead is kept at a significantly lower level compared to the prior art. The overhead is significantly reduced compared to the coordination schemes as disclosed in PCT applications PCT/CN2014/070999 and PCT/CN2014/070997 due to only network-wide information being exchanged between different networks, i.e. only a blanking pattern for each network instead of a coordination context for multiple link pairs. Moreover, fairness of resource allocation between different operating networks may be guaranteed. The determined blanking patterns may be valid for a relevant long time scale which is feasible for inter-network spectrum sharing.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
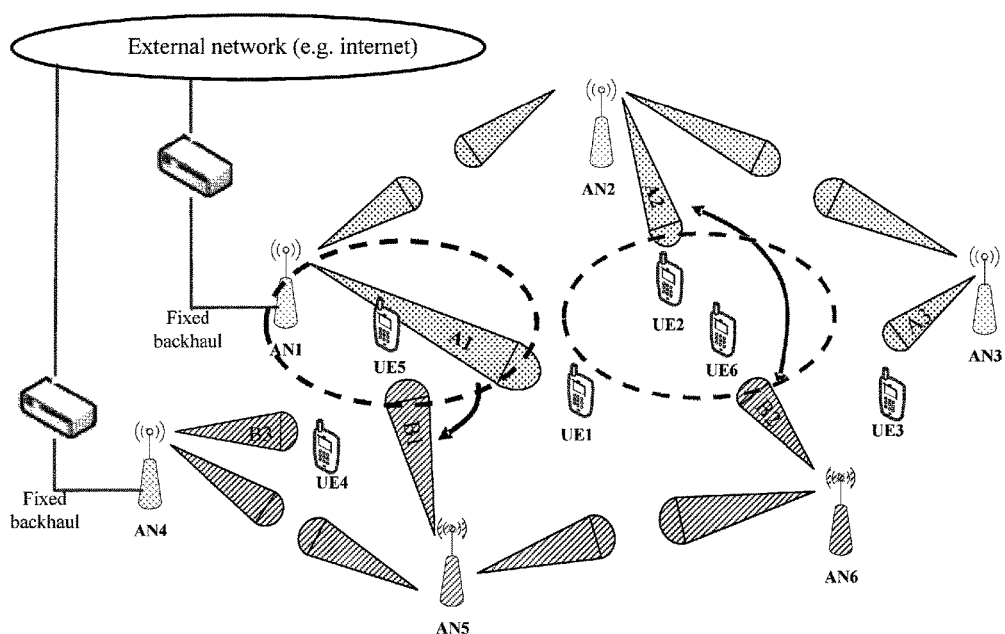
FIG. 1 illustrates an inter-network interference situation between two operating networks sharing the spectrum.

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms 'first' and 'second' etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skill in the art to which this disclosure belongs. For example, the term access node, AN, used herein may be referred to as e.g. eNB, eNodeB, NodeB, Base Station, Base Transceiver Station BTS or Access Point, depending on the technology and terminology used.

For illustrative purposes, several embodiments of the present disclosure will be described in the context of MMW networks. Those skilled in the art will appreciate, however, that several embodiments of the present disclosure may be more generally applicable to other wireless networks.

Figure 2:
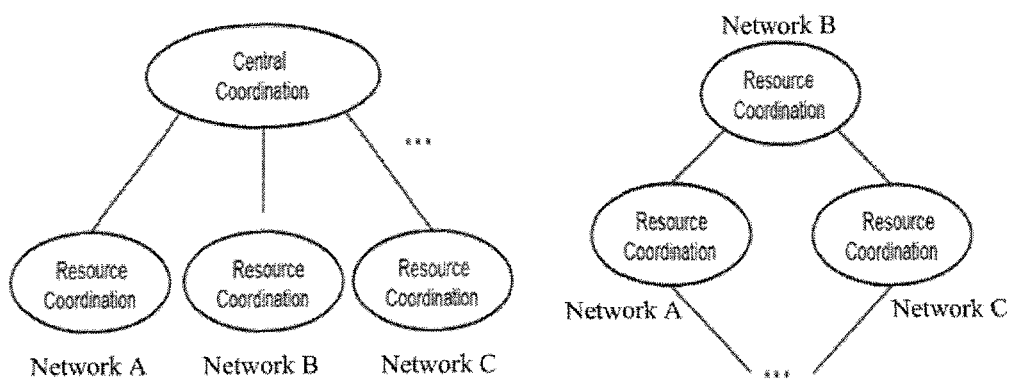
FIG. 2 illustrates two topologies for performing resource coordination.

Before the description of embodiments of the present disclosure, different topologies for performing resource coordination are introduced with reference to FIG. 2, which comprise a centralized coordination topology and a distributed coordination topology.

In a centralized topology as illustrated on the left of FIG. 2, all information on resource usage of networks A, B and C may be collected first by a central coordination function, which then makes a final decision on coordinated resource usage for multiple connected operating networks, e.g. MMW networks. In a distributed topology as illustrated on the right of FIG. 2, two neighboring networks, e.g. networks A and B exchange information and negotiate with each other to determine the coordinated resource usage. Compared to centralized topology, the distributed topology is more flexible and prompt in interference coordination and more efficient in terms of amount of signaling exchange.

Figure 3:
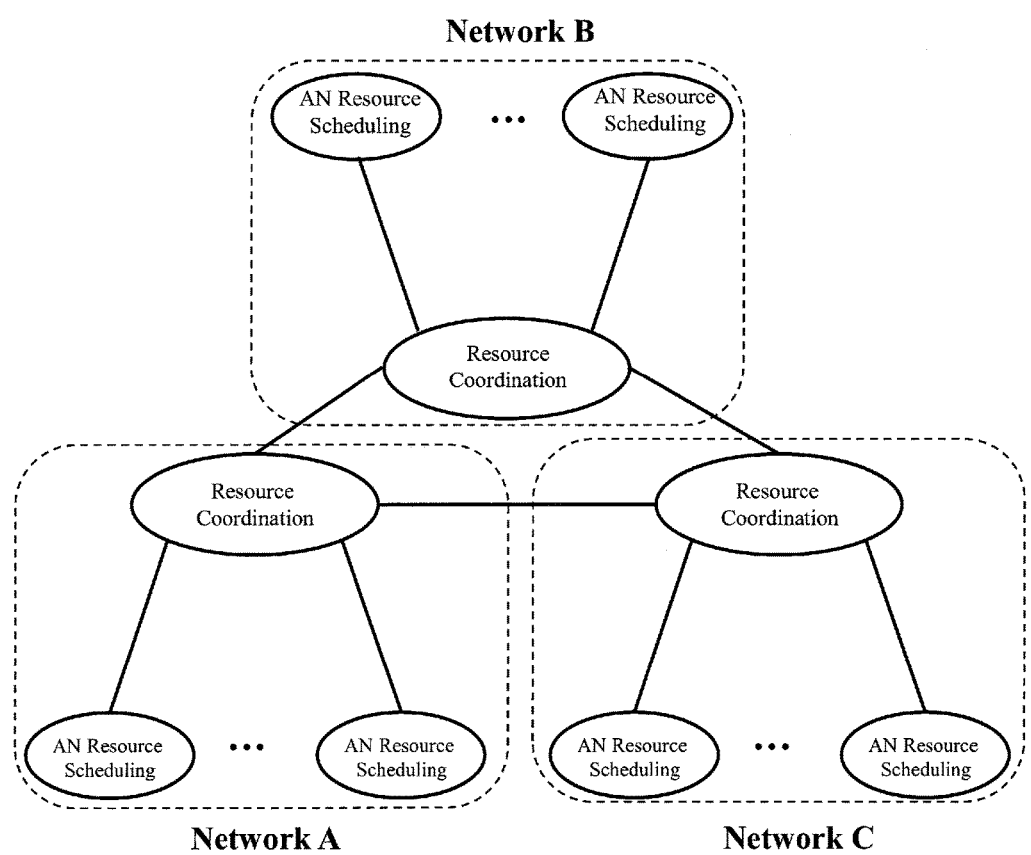
FIG. 3 illustrates the distributed topology on which embodiments of the present disclosure are discussed based.

The following embodiments of the present disclosure will be discussed based on the distributed topology as illustrated in FIG. 3. In FIG. 3, each operating network A, B or C has a resource coordination functional entity that may be responsible for resource coordination between two neighboring operating networks and also for resource coordination between Access Nodes, ANs, belonging to the operating network itself. The resource coordination functional entity may be configured in an AN or in a central control unit. Each operating network also has an AN resource scheduling functional entity that is specific to an AN and may be responsible for allocating resources to all its involved links, including access links and backhaul links based on a received constraint on allowed resources.

Figure 4:
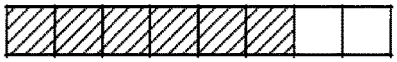
FIG. 4 illustrates, in combination with the scenario as illustrated in FIG. 1, the concept of the proposed solution according to embodiments of the present disclosure.

FIG. 4 illustrates, in combination with the scenario as illustrated in FIG. 1, the concept of the proposed solution according to embodiments of the present disclosure.

According to embodiments of the present disclosure, only one network-wide blanking pattern is determined for each operating network between the involved operating networks. The only one network-wide blanking pattern indicates which resource blocks RBs are not allowed to be scheduled and which RBs are schedulable. The RBs may be subframes or subcarriers, for example.

As illustrated in FIG. 4, a first blanking pattern CB1 is the blanking pattern coordinated for the first operating network of FIG. 1, which includes two white blocks indicating blank RBs that are not allowed to be scheduled and six striped blocks indicating RBs that are schedulable; and a second blanking pattern CB2 is the blanking pattern coordinated for the second operating network of FIG. 1, which also includes two white blocks indicating blank RBs and six striped blocks indicating schedulable RBs, but these blank RBs are located in different positions from those in CB1. The first blanking pattern CB1 and the second blanking pattern CB2 may be termed as being "orthogonal".

The coordinated blanking patterns may be respectively applied at different levels to an aggressor network causing interference and a victim network interfered by the aggressor network, or to an aggressor AN causing interference or a victim AN interfered by the aggressor AN, or to an aggressor link causing interference or a victim link interfered by the aggressor link. In a case of bi-directional interference, two involved operating networks constitute the aggressor network and victim network to each other. For example, as illustrated in FIG. 1, the first operating network constitutes the aggressor network to the second operating network and meanwhile it is the victim network of the second operating network. This symmetrical relationship may also be applicable to the aggressor AN and the victim AN or the aggressor link and the victim link.

In particular, the coordinated blanking pattern, e.g. CB1 may be applied at a network level to the entire aggressor network, e.g. the first operating network of FIG. 1, which means all links belonging to the aggressor network shall be scheduled according to the coordinated blanking pattern. For example, all links denoted with the dotted pattern in FIG. 1 are not allowed to be scheduled in the RBs denoted by the white blocks in CB1.

The coordinated blanking pattern, for example CB1 may alternatively be applied at a node-level to all aggressor ANs, which means all links belonging to the aggressor ANs shall be scheduled according to the coordinated blanking pattern but other links belonging to other ANs are not. The information on aggressor ANs may be signaled by the victim network to the aggressor network. For example, AN1 and AN2 as illustrated in FIG. 1 are aggressor ANs to the second operating network, while AN3 is not. Therefore, all links under AN1 and AN2 are not allowed to be scheduled in the RBs denoted by the white blocks in CB1 while other links under AN3 may be scheduled in all RBs.

The coordinated blanking pattern, for example CB1 may alternatively be applied at a link level to all aggressor links, which means all aggressor links that cause interference may be scheduled according to the coordinated pattern but others are not. The information on aggressor links may be signaled from the victim network to the aggressor network. For example, as illustrated in FIG. 1, only links A1 and A2 are not allowed to be scheduled on the RBs denoted by the white blocks in CB1, while all other links in the first operating network may be scheduled on all RBs.

On victim side, victim links are preferred to be scheduled on RBs corresponding to those blank RBs in the coordinated blanking pattern for the aggressor network. For instance, link A2 of the first operating network is preferred to be scheduled on the first two RBs in the CB2 which are blanked out for the second operating network, while links B1 and B2 are preferred to be scheduled on the last two RBs of the CB1 so that the inter-network interference may be efficiently avoided.

Figure 5:
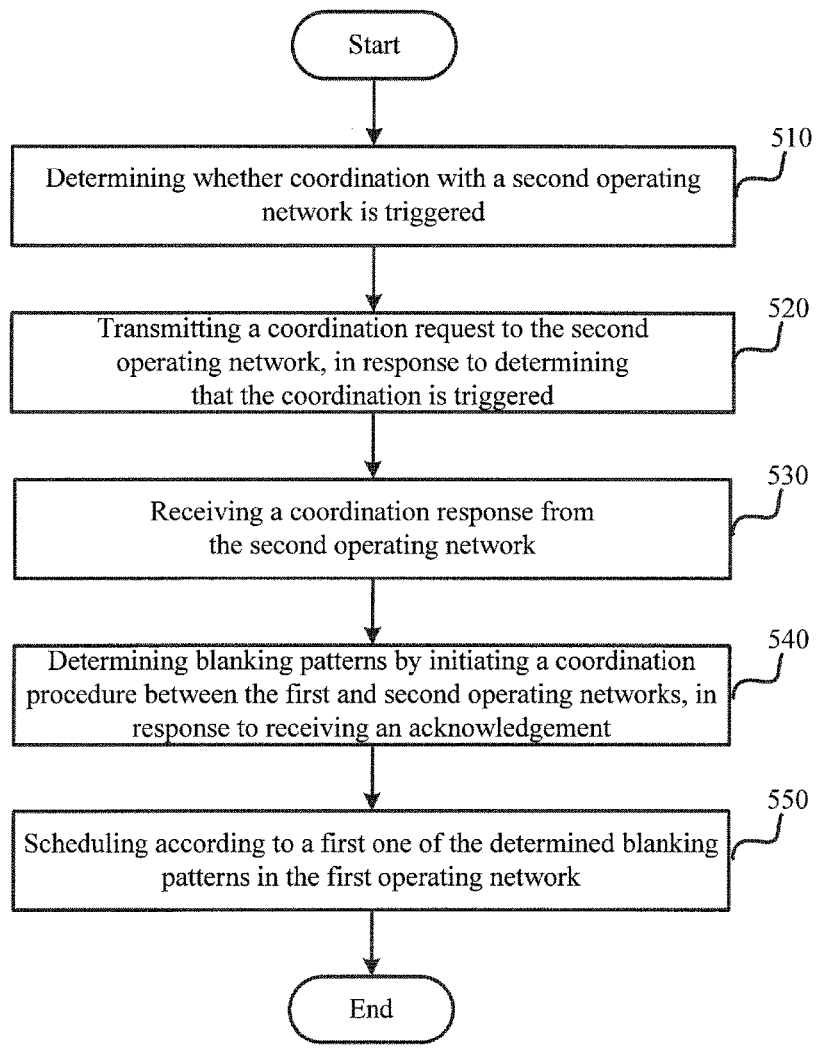
FIG. 5 illustrates a flowchart of a method 500 for coordinating resources according to an embodiment of the present disclosure.

FIG. 5 illustrates a flowchart of a method 500 for coordinating resources between different operating networks according to an embodiment of the present disclosure. The method 500 may be performed at an AN or a central control unit in a first operating network of the different operating networks.

The method 500 comprises determining whether coordination with a second operating network is triggered in block 510.

In one embodiment, coordination of the first operating network with the second operating network may be triggered periodically, e.g. with 1000 Transmission Time Intervals TTIs, if the second operating network is discovered to be deployed adjacent to or overlapping with the first operating network. There may be a timer preset in each operating network for coordination with a discovered neighbor network, i.e. the coordination may be triggered when the timer times out. Those skilled in the art shall appreciate that the timers for coordination with different operating networks may be different.

In another embodiment, the first operating network may perform interference measurement for the second operating network when it is discovered to be deployed adjacent to or overlapping with the first operating network. The coordination may then be triggered when new interference from the second operating network is detected.

The method 500 also comprises transmitting, in block 520, a coordination request to the second operating network, in response to determining that the coordination is triggered, and then receiving, in block 530, a coordination response form the second operating network.

In response to receiving an acknowledgement ACK in the coordination response from the second operating network, the method 500 determines blanking patterns by initiating a coordination procedure between the first and second operating networks in block 540.

In one embodiment, the coordination procedure may further comprise blanking ratio coordination and blanking position coordination.

There are several approaches for the blanking ratio coordination. The blanking ratio is defined as a ratio of the number of blank RBs to a total number of all RBs in a blanking pattern.

In one example, a blanking ratio threshold may be preset to a fixed value for each of the operating networks. Both the first and second operating networks may blank their resources with a same ratio. For example, if the preset blanking ratio threshold is set to 20%, then each of the operating networks may blank 20% of respective resources. Alternatively, the blanking ratio threshold may be configured semi-statically between the operating networks according to requirements.

In another example, the blanking ratio may be divided into two parts, i.e. a mandatory part, e.g. 10% and an optional part. The mandatory part may refer to a minimum ratio of the resources to be blanked out and may be predefined or semi-statically configured between the two operating networks. The optional part may be determined by each operating network depending on its traffic load status.

In yet another example, each of two coordinating networks, i.e. the first and second operating networks may propose a required blanking ratio for its counterpart network and then the first operating network may average the two proposed blanking ratios as the final coordinated blanking ratio. By this way, fairness may be guaranteed between two coordinating networks and each network will not propose a too high blanking ratio since it will equivalently increase its own blanking ratio as well. The proposed blanking ratio may be based on their respective requirements, e.g. the first operating network may propose 20% for the second operating network if the estimated traffic load on the interfered links of the first operating network will occupy 20% of its whole resources. Additionally, the proposed blanking ratio may be restricted within a range (Rmin, Rmax), where Rmin denotes the minimum blanking ratio and Rmax denotes the maximum blanking ratio which may be pre-determined according to previous experiences or may be specified in future standards.

Also, there are several approaches for the blanking position coordination. The blanking position coordination may be embodied as the selection of a blanking pattern.

For example, the first operating network may select two orthogonal blanking patterns, BPs, from predefined BPs according to the coordinated blanking ratio and then signal the selected BPs to the second operating network. The predefined BPs may be known to both the first and second operating networks.

Alternatively, the first operating network may select a blanking pattern BP1 from predefined BPs according to the coordinated blanking ratio and then signal the selected BP1 in a Blanking Pattern Proposal to the second operating network. Correspondingly, a blanking pattern BP2 which is orthogonal to BP1 may be selected from the predefined BPs and signaled in a Blanking Pattern Response to the first operating network from the second operating network.

Figure 6:
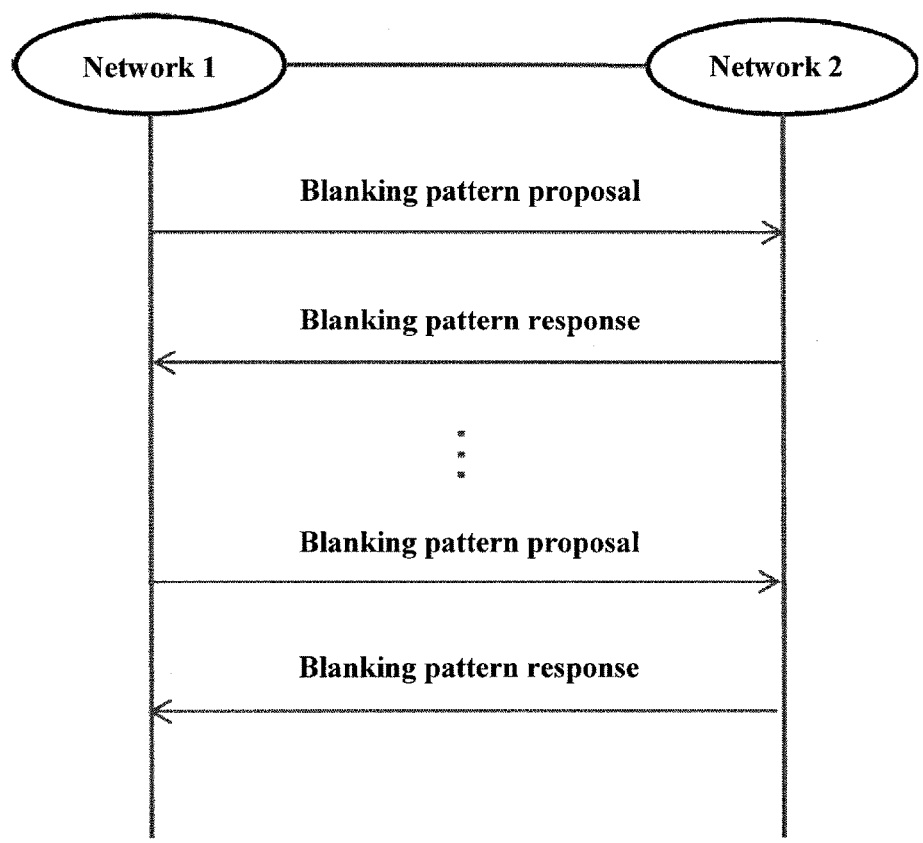
FIG. 6 illustrates a procedure for negotiating a blanking pattern between two coordinating networks.

Alternatively, the blanking pattern may be negotiated between two coordinating networks via multiple rounds of signaling exchange in the procedure as shown in FIG. 6. Firstly, the first operating network may propose blanking patterns for both operating networks in a Blanking Pattern Proposal. Then, there will be an ACK in a Blanking Pattern Response, if the second operating network agrees on the proposed blanking patterns; otherwise there will be a NACK and re-proposed blanking patterns in the Blanking Pattern Response. The negotiation may fail if there is no agreement on the blanking patterns within a configured maximum number of rounds. Then a minimum blanking ratio may be applied for each network or a re-coordination process may be established, which will repeat the procedure as shown in FIG. 6. Alternatively, the negotiation procedure may be initiated by the second operating network.

Once the blanking patterns are determined, the method 500 proceeds to schedule according to a first one of the determined blanking patterns in block 550 in the first operating network. A second one of the determined blanking patterns, which is different from the first blanking pattern, may be adopted in the second operating network. Preferably, the first blanking pattern and the second blanking pattern may be orthogonal. To schedule may in some embodiments mean to perform a scheduling operation in the first operating network. According to some embodiments as described herein, the schedule may include scheduling links, resources or UEs etc. in the first operating network according to the first one of the determined blanking patterns.

In one embodiment, the determined blanking pattern for each operating network may be signaled to corresponding ANs in that operating network to perform the scheduling at different levels. Details for the execution of scheduling at different levels have been described with reference to FIG. 4, which thus will be omitted herein for the purpose of conciseness. Preferably, the blanking patterns may at least comprise two orthogonal blanking patterns which are used respectively for the first and second operating networks. Further preferably, the first operating network may schedule the links interfered by the second operating network on one or more resources in one of the two orthogonal blanking patterns that are corresponding to one or more blank resources in the other one of the two orthogonal blanking patterns. The blank resources refer to those resources which are blanked out and thus not allowed to be scheduled in the other one of the two orthogonal blanking patterns.

Figure 7:
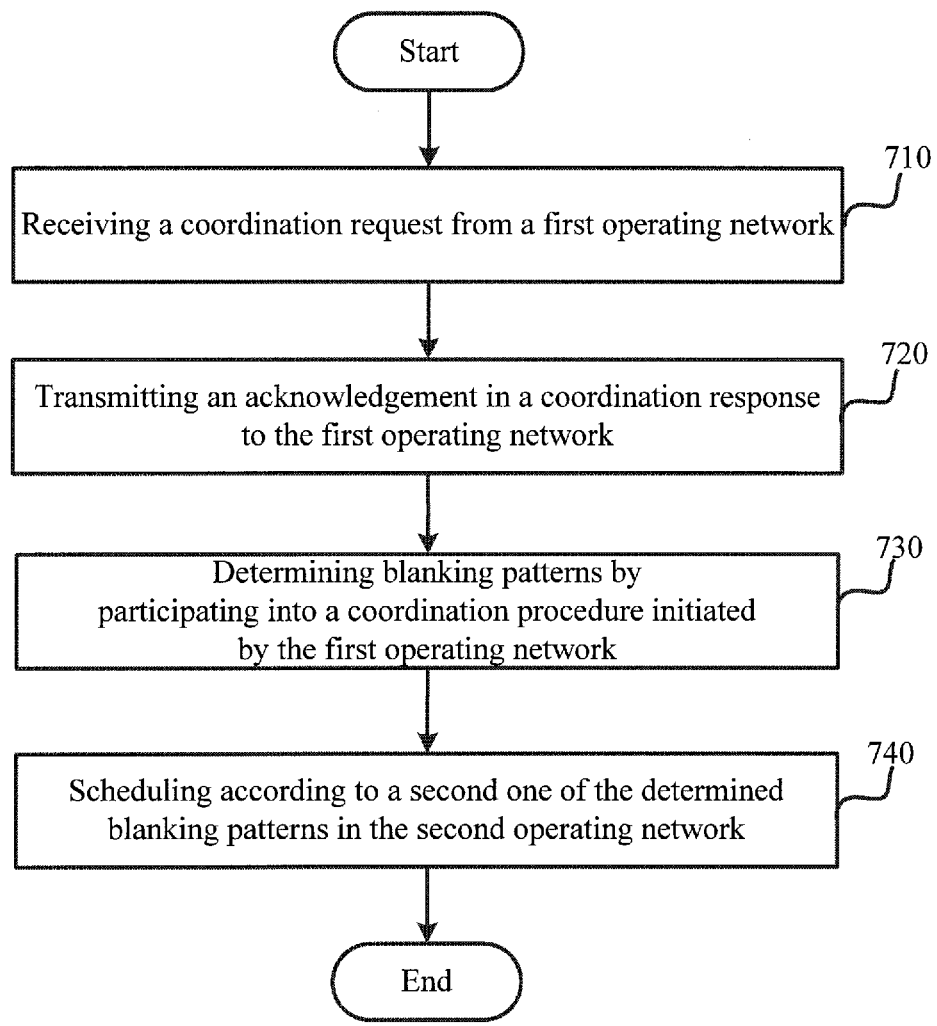
FIG. 7 illustrates a flowchart of a method 700 for coordinating resources according to an embodiment of the present disclosure.

FIG. 7 illustrates a flowchart of a method 700 for coordinating resources between different operating networks according to an embodiment of the present disclosure. The method 700 may be performed at an AN or a central control unit in a second operating network of the different operating networks.

The method 700 comprises receiving a coordination request from a first operating network in block 710 and transmitting an acknowledgement in a coordination response to the first operating network in block 720.

The method 700 also comprises determining blanking patterns in block 730 by participating in a coordination procedure initiated by the first operating network.

In one embodiment, the coordination procedure may comprise blanking ratio coordination and blanking position coordination which are similar to those steps as discussed with regard to method 700.

There are several approaches for the blanking ratio coordination.

In one example, a blanking ratio threshold may be preset to a fixed value for each of the operating networks. Both the first and second operating networks will blank their resources with a same ratio. For example, if the preset blanking ratio threshold is set to 20%, then each of the operating networks may blank 20% of respective resources. Alternatively, the blanking ratio threshold may be configured semi-statically between the operating networks according to requirements.

In another example, the blanking ratio may be divided into two parts, i.e. a mandatory part, e.g. 10% and an optional part. The mandatory part may refer to a minimum ratio of the resources to be blanked out and may be pre-defined or semi-statically configured between the two operating networks. The optional part may be determined by each operating network depending on its traffic load status.

In yet another example, each of two coordinating networks, i.e. the first and second operating networks may propose a required blanking ratio for its counterpart network and the second operating network may average the two proposed blanking ratios as the final coordinated blanking ratio. By this way, fairness may be guaranteed between two coordinating networks and each network will not propose a too high blanking ratio since it will equivalently increase its own blanking ratio as well. The proposed blanking ratio may be based on their respective requirements, e.g. the first operating network may propose 20% for the second operating network if the estimated traffic load on the interfered links of the first operating network will occupy 20% of its whole resources. Additionally, the proposed blanking ratio may be restricted within a range (Rmin, Rmax), where Rmin denotes the minimum blanking ratio and Rmax denotes the maximum blanking ratio which may be pre-determined according to previous experiences or may be specified in future standards.

Also, there are several approaches for the blanking position coordination. The blanking position coordination may be embodied as the selection of a blanking pattern.

For example, the second operating network may select two orthogonal blanking patterns from predefined BPs according to the coordinated blanking ratio and then signal the selected BPs to the first operating network. The predefined BPs may be known to both the first and second operating networks.

Alternatively, the second operating network may select an orthogonal blanking pattern BP1 from predefined BPs according to the determined blanking ratio and then signal the selected BP1 in a Blanking Pattern Proposal to the second operating network. Correspondingly, a blanking pattern BP2 which is orthogonal to BP1 may be selected from the predefined BPs and signaled in a Blanking Pattern Response to the second operating network from the first operating network.

Alternatively, the blanking pattern may be negotiated between two coordinating networks via multiple rounds of signaling exchange. Reversed to the order as illustrated in FIG. 6, firstly, the second operating network may propose blanking patterns for both operating networks in a Blanking Pattern Proposal. Then, there will be an ACK in a Blanking Pattern Response, if the first operating network agrees on the proposed blanking patterns; otherwise there will be a NACK and re-proposed blanking patterns in the Blanking Pattern Response. The negotiation may fail if there is no agreement on the blanking patterns within a configured maximum number of rounds. Then a minimum blanking ratio may be applied for each network or a re-coordination process may be established.

Once the blanking patterns are determined, the method 700 proceeds to schedule according to a second one of the determined blanking patterns in block 740. A first one of the determined blanking patterns, which is different from the second blanking pattern, may be adopted in the first operating network. Preferably, the first blanking pattern and the second blanking pattern may be orthogonal. To schedule may in some embodiments mean to perform a scheduling operation in the second operating network. According to some embodiments as described herein, the schedule may include scheduling links, resources or UEs etc. in the second operating network according to the second one of the determined blanking patterns.

In one embodiment, the determined blanking pattern for each operating network may be signaled to corresponding ANs in that operating network to perform the scheduling at different levels. Details for the execution of scheduling at different levels have been described with reference to FIG. 4, which thus will be omitted herein for the purpose of conciseness. Preferably, the blanking patterns may comprise two orthogonal blanking patterns which are used respectively for the first and second operating networks. Further preferably, the first operating network may schedule the links interfered by the second operating network on one or more resources in one of the two orthogonal blanking patterns that are corresponding to one or more blank resources in the other one of the two orthogonal blanking patterns. The blank resources refer to those resources which are blanked out and thus not allowed to be scheduled in the other one of the two orthogonal blanking patterns.

Those skilled in the art shall appreciate that the terms 'first operating network' and 'second operating network' are used herein to differentiate two different networks that are sharing the spectrum and overlapping, adjacent or neighboring to each other. It is not necessary to indicate the first or second operating network as an aggressor network or victim network, and instead they may be both. Therefore, the terms "a method 500 in a first operating network" and "a method 700 in a second operating network" are used herein to differentiate two methods which may be used respectively in two operating networks that are sharing a spectrum and overlapping, adjacent or neighboring to each other, not necessarily to be used in an aggressor network or a victim network.

Figure 8:
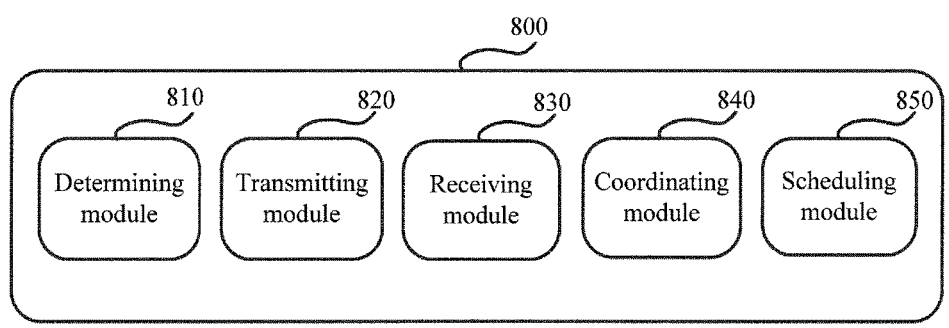
FIG. 8 illustrates a schematic block diagram of an apparatus 800 adapted for coordinating resources between different networks according to an embodiment of the present disclosure.

FIG. 8 illustrates a schematic block diagram of an apparatus 800 adapted for coordinating resources between different operating networks according to an embodiment of the present disclosure. The apparatus 800 may be located at an AN or a central control unit in a first operating network of the different operating networks. As illustrated in FIG. 8, the apparatus 800 comprises a determining module 810, a transmitting module 820, a receiving module 830, a coordinating module 840 and a scheduling module 850.

The determining module 810 is configured to determine whether coordination with a second operating network is triggered. Detailed operations of the determining module 810 according to several embodiments of the present disclosure are similar to those as described in relation to block 510 of FIG. 5, which thus will not be repeated herein for the purpose of conciseness.

The transmitting module 820 is configured to transmit a coordination request to the second operating network, in response to the determining module 810 determining that the coordination is triggered.

The receiving module 830 is configured to receive a coordination response from the second operating network.

The coordinating module 840 is configured to determine blanking patterns by initiating a coordination procedure between the first and second operating networks, in response to receiving an acknowledgement in the coordination response from the second operating network. Detailed operations of the coordinating module 840 according to several embodiments of the present disclosure are similar to those as described in relation to block 540 of FIG. 5, which thus will not be repeated herein for the purpose of conciseness.

The scheduling module 850 is configured to perform scheduling according to one of the determined blanking patterns. Detailed operations of the scheduling module 850 according to several embodiments of the present disclosure are similar to those as described in relation to block 550 of FIG. 5, which thus will not be repeated herein for the purpose of conciseness.

Figure 9:
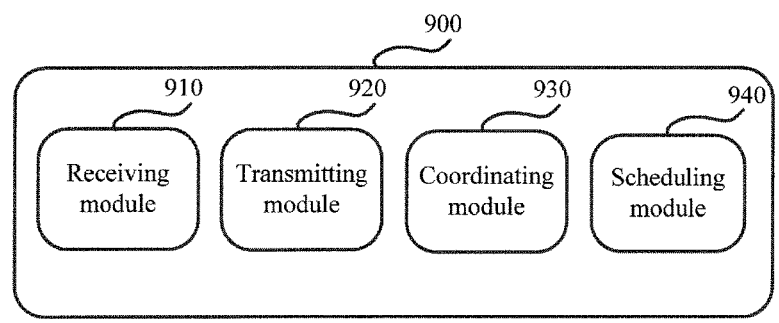
FIG. 9 illustrates a schematic block diagram of an apparatus 900 adapted for coordinating resources between different networks according to an embodiment of the present disclosure.

FIG. 9 illustrates an apparatus 900 for coordinating resources between different operating networks according to an embodiment of the present disclosure. The apparatus 900 may be located at an AN or a central control unit in a second operating network of the different operating networks. The apparatus 900 comprises a receiving module 910, a transmitting module 920, a coordinating module 930 and a scheduling module 940.

The receiving module 910 is configured to receive a coordination request from a first operating network.

The transmitting module 920 is configured to transmit an acknowledgement in a coordination response to the first operating network.

The coordinating module 930 is configured to determine blanking patterns by participating in a coordination procedure initiated by the first operating network. Detailed operations of the coordinating module 930 according to several embodiments of the present disclosure are similar to those as described in relation to block 730 of FIG. 7, which thus will not be repeated herein for the purpose of conciseness.

The scheduling module 940 is configured to perform scheduling according to one of the determined blanking patterns. Detailed operations of the scheduling module 940 according to several embodiments of the present disclosure are similar to those as described in relation to block 740 of FIG. 7, which thus will not be repeated herein for the purpose of conciseness.

Figure 10:
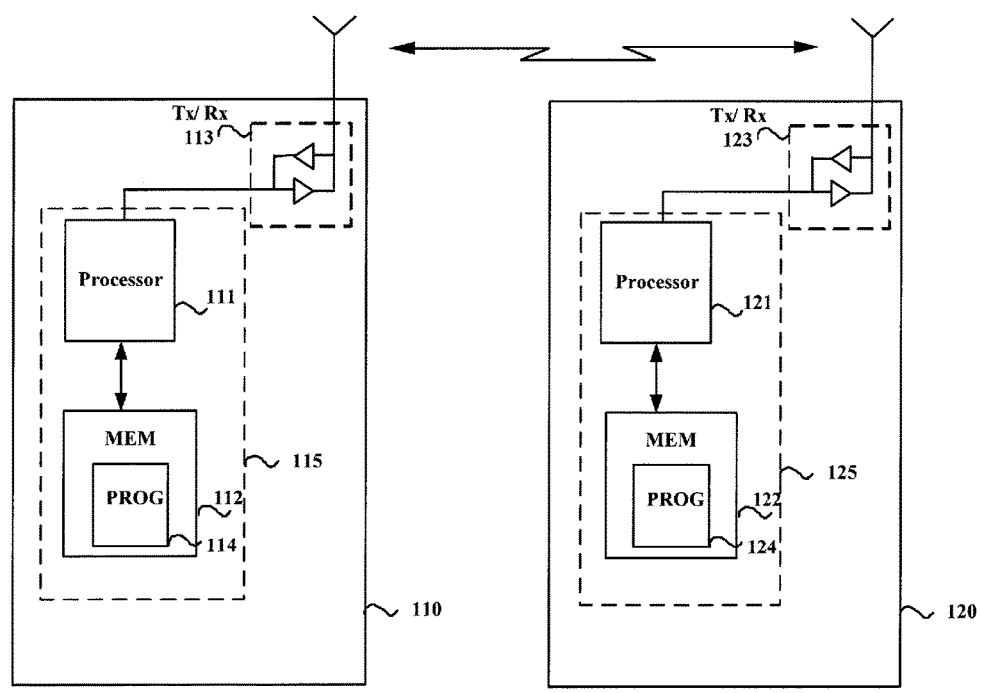
FIG. 10 illustrates a simplified block diagram of an apparatus 110 and an apparatus 120 that are suitable for coordinating resources between different operating networks according to embodiments of the present disclosure.

FIG. 10 illustrates a simplified block diagram of an apparatus 110 and an apparatus 120 that are suitable for coordinating resources between different operating networks according to embodiments of the present disclosure. The apparatuses 110 and 120 may be respectively located in a first operating network and a second operating network of the different operating networks.

The apparatus 110 comprises at least one processor 111, such as a data processor (DP) and at least one memory (MEM) 112 coupled to the processor 111. The apparatus 110 may further comprise a suitable RF transmitter TX and receiver RX 113 coupled to the processor 111, which may be implemented in a single component or separate components. The MEM 112 stores a program (PROG) 114. The PROG 114 may include instructions that, when executed on the associated processor 111, enable the apparatus 110 to operate in accordance with the embodiments of the present disclosure, for example to perform the method 500. The TX/RX 113 may be used for bidirectional radio communication with other apparatuses or devices in another network, e.g. the apparatus 120. Note that the TX/RX 113 has at least one antenna to facilitate the communication. A combination of the at least one processor 111 and the at least one MEM 112 may form processing means 115 adapted to implement various embodiments of the present disclosure.

The apparatus 120 comprises at least one processor 121, such as a DP, at least one MEM 122 coupled to the processor 121. The apparatus 120 may further comprise a suitable RF TX/RX 123 coupled to the processor 121, which may be implemented in a single component or separate components. The MEM 122 stores a PROG 124. The PROG 124 may include instructions that, when executed on the associated processor 121, enable the apparatus 120 to operate in accordance with the embodiments of the present disclosure, for example to perform the method 700. The TX/RX 123 is for bidirectional radio communications with other apparatuses or devices in another network, e.g. the apparatus 110. Note that the TX/RX 123 has at least one antenna to facilitate the communication. A combination of the at least one processor 121 and the at least one MEM 122 may form processing means 125 adapted to implement various embodiments of the present disclosure.

Various embodiments of the present disclosure may be implemented by computer program executable by one or more of the processor 111 and 121, software, firmware, hardware or in a combination thereof.

The MEMs 112 and 122 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatuses 110 or 120, there may be several physically distinct memory units in them.

The processors 111 and 121 may be of any type suitable to the local technical environment, and may include one or more of general purpose computers, special purpose computers, microprocessors, digital signal processors DSPs and processors based on multicore processor architecture, as non-limiting examples. Each of the apparatuses 110 and 120 may have multiple processors, such as an application specific integrated circuit ASIC chip that is slaved in time to a clock which synchronizes the main processor.

Although the above description is made in the context of MMW networks, it should not be construed as limiting the spirit and scope of the present disclosure. The idea and concept of the present disclosure can be generalized to also cover other wireless networks which might have an inter-network interference issue.

Each apparatus as proposed above may be embodied as the apparatus 110 or 120 as discussed with reference to FIG. 10, and therefore the processor, the memory, and the instructions could be equally embodied as the processor 111 or 121, memory 112 or 122 and program 114 or 124, respectively.

Further, according to different implementation manners, the present disclosure also provides a computer program, comprising instructions which, when executed on at least one processor, e.g., the processor 111, cause the at least one processor to carry out the method according to any one of claims 1 to 7 as attached in the following claims.

According to different implementation manners, the present disclosure also provides a computer program, comprising instructions which, when executed on at least one processor, e.g., the processor 121, cause the at least one processor to carry out the method according to any one of claims 8 to 13 as attached in the following claims.

In addition, the present disclosure provides a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods, apparatuses, i.e. systems. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment comprises at least one computer readable storage medium, on which the foregoing computer program instructions are stored. The computer readable storage medium can be, for example, an optical compact disk or an electronic memory device like a RAM (random access memory), a ROM (read only memory), Flash memory, magnetic tape, CD-ROM, DVD, Blue-ray disc and the like.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The disclosure and its embodiments are not limited to the examples described above but may vary within the scope of the claims.

It should also be noted that the above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method in a first operating network for coordinating resources between the first operating network and a second operating network, the method comprising:
   determining whether coordination with the second operating network is triggered;
   transmitting a coordination request to the second operating network, in response to determining that the coordination is triggered;
   receiving a coordination response from the second operating network;
   determining at least two blanking patterns by initiating a coordination procedure between the first and second operating networks, in response to receiving an acknowledgement in the coordination response from the second operating network; and
   scheduling according to a first blanking pattern of the at least two determined blanking patterns, in the first operating network.

2. The method according to claim 1, wherein:
   a second blanking pattern of the at least two determined blanking patterns is used in the second operating network for scheduling, and
   the second blanking pattern is different from the first blanking pattern.

3. The method according to claim 1, wherein said scheduling according to the first blanking pattern of the at least two determined blanking patterns comprises one of:
   scheduling, according to the first blanking pattern, all links in the first operating network;
   scheduling, according to the first blanking pattern, all links belonging to one or more access nodes in the first operating network that cause interference to the second operating network; or
   scheduling, according to the first blanking pattern, one or more links in the first operating network that cause interference to the second operating network.

4. The method according to claim 1, wherein the coordination with the second operating network is triggered periodically or by detection of new interference from the second operating network.

5. The method according to claim 1, wherein the coordination procedure comprises blanking ratio coordination and blanking position coordination between the first and second operating networks.

6. The method according to claim 5, wherein the blanking ratio coordination comprises averaging two blanking ratios proposed by the first and second operating networks respectively, as a coordinated blanking ratio for the at least two determined blanking patterns.

7. The method according to claim 5, wherein the blanking position coordination comprises:
   selecting from a plurality of predefined blanking patterns two different blanking patterns according to a blanking ratio obtained from the blanking ratio coordination; and
   signaling the selected two different blanking patterns to the second operating network.

8. An apparatus in a first operating network for coordinating resources between the first operating network and a second operating network, the apparatus comprising:
   a processor configured to:
      determine whether coordination with the second operating network is triggered;
      determine at least two blanking patterns by initiating a coordination procedure between the first and second operating networks, in response to receiving an acknowledgement in a coordination response from the second operating network; and
      perform scheduling, according to a first blanking pattern of the at least two determined blanking patterns, in the first operating network, a transmitter coupled to the processor, wherein the transmitter is configured to:
   transmit a coordination request to the second operating network, in response to a determination that the coordination is triggered, and
   a receiver coupled to the processor, wherein the receiver is configured to:
      receive the coordination response from the second operating network.

9. The apparatus according to claim 8, wherein:
   a second blanking pattern of the at least two determined blanking patterns is used in the second operating network for scheduling, and
   the second blanking pattern is different from the first blanking pattern.

10. The apparatus according to claim 8, wherein the processor is configured to perform one of:
   scheduling, according to the first blanking pattern, all links in the first operating network;
   scheduling, according to the first blanking pattern, all links belonging to one or more access nodes in the first operating network that cause interference to the second operating network; or
   scheduling, according to the first blanking pattern, one or more links in the first operating network that cause interference to the second operating network.

11. The apparatus according to claim 8, wherein the coordination procedure comprises blanking ratio coordination and blanking position coordination between the first and second operating networks.

12. The apparatus according to claim 11, wherein the processor is further configured to average two blanking ratios proposed by the first and second operating networks respectively, as a coordinated blanking ratio for the at least two determined blanking patterns.

13. The apparatus according to claim 11, wherein the processor is further configured to select, from a plurality of predefined blanking patterns two different blanking patterns according to a blanking ratio obtained from the blanking ratio coordination and wherein the transmitter is further configured to signal the selected two different blanking patterns to the second operating network.

14. An apparatus in a first operating network for coordinating resources between the first operating network and a second operating network, comprising a processor and a memory, said memory containing instructions executable by said processor wherein said apparatus is operative to:
- determine whether coordination with the second operating network is triggered;
- transmit a coordination request to the second operating network, in response to a determination that the coordination is triggered;
- receive a coordination response from the second operating network;
- determine at least two blanking patterns by initiating a coordination procedure between the first and second operating networks, in response to receiving an acknowledgement in the coordination response from the second operating network; and
- schedule, according to a first blanking pattern of the at least two determined blanking patterns, in the first operating network.

* * * * *